United States Patent [19]

Gharpuray

[11] Patent Number: 5,471,657
[45] Date of Patent: Nov. 28, 1995

[54] FREQUENCY TUNING FOR SATELLITE GROUND STATIONS

[75] Inventor: Archana M. Gharpuray, Gaithersburg, Md.

[73] Assignee: Hughes Aircraft Company, Los Angeles, Calif.

[21] Appl. No.: 986,845

[22] Filed: Dec. 4, 1992

[51] Int. Cl.$^6$ ................................................ H04B 7/185
[52] U.S. Cl. .................... 455/12.1; 455/50.1; 455/67.3; 455/71
[58] Field of Search ....................... 375/362, 356, 375/358; 370/75, 97, 104.1, 85.1; 455/12.1, 13.2, 67.1, 17, 67.3, 67.6, 49.1, 51.1, 52.1, 52.2, 52.3, 11.1, 63, 50.1, 68, 71, 69

[56] References Cited

U.S. PATENT DOCUMENTS 4,509,200  4/1985  Lugenbuhl et al. .................. 455/13.2

Primary Examiner—Reinhard J. Eisenzopf
Assistant Examiner—Nguyen Vo

Attorney, Agent, or Firm—Gordon R. Lindeen, III; Wanda K. Denson-Low

[57] ABSTRACT

A satellite communications network tuning system which consumes very little communications bandwidth is disclosed. The network has a first terminal for transmitting and receiving signals, a second terminal in communication with the first for transmitting signals and a satellite for receiving signals from the terminals and retransmitting them. The frequency of the retransmitted signals is offset from the frequency at which the signals were received. A method according to the present invention for compensating the transmit frequency of the second terminal for the satellite frequency offset comprises transmitting a signal from the first terminal to the satellite at a first frequency, receiving the retransmitted signal from the satellite at the first terminal at a second frequency, the second frequency being offset from the first frequency by the satellite, measuring, at the first terminal, the difference between the first frequency and the second frequency to obtain an offset, transmitting the offset from the first terminal to the second terminal, and adjusting the transmit frequency of the second terminal using the offset.

11 Claims, 1 Drawing Sheet

FREQUENCY TUNING FOR SATELLITE GROUND STATIONS

FIELD OF THE INVENTION

The present invention pertains to the field of tuning systems for satellite ground stations and in particular for a method for compensating for offsets in transmission frequencies used by ground stations communicating with each other via a satellite.

BACKGROUND OF THE INVENTION

Satellite communication networks are increasingly being used for communicating a variety of different kinds of signals including voice, data, video and audio between remote locations. Such networks may transmit signals synchronously in order to support conversations or video teleconferences or asynchronously for transmitting data, for example inventory and sales information between sales outlets and a headquarters or warehouse depot. In many applications, the ground stations transmit signals to each other in the form of bursts. Receiving stations must be able to tune to these bursts almost instantly despite offsets and drift introduced by the ground stations, the satellite and the environment. In order to compensate for these offsets and drifts, specific tuning or pilot signals are sometimes used. These signals are transmitted continuously at a known frequency by a control station as a reference allowing each of the ground stations to track transmissions from other stations using the reference. The pilot signal, however, consumes bandwidth that might otherwise be used for communications and requires that ground station resources be dedicated to tuning to the pilot signal. An alternative approach is to ignore the offsets and drifts. The receiving station can simply attempt to lock onto any signals that are close to the assigned receive frequency. However, this technique introduces delays and errors in the reception of the signals. In addition, the transmitted bursts must be long enough to allow time for tuning and the modem at each receiving station must have a great enough frequency range to allow the disparate signals to be captured. This reduces the precision or increases the cost of the modem.

SUMMARY OF THE PRESENT INVENTION

The present invention allows a large number of remote ground stations to compensate for offsets and drift in a bursty satellite communications network without consuming communications bandwidth and without adding to the cost of the remote terminals. It can also be applied to advantage in less bursty networks. In one embodiment, the invention encompasses a method for compensating the transmit frequency of a ground station terminal for the satellite frequency offset In a satellite communications network. The network has a first terminal for transmitting and receiving signals, a second terminal, in communication with the first, for transmitting signals and a satellite for receiving signals from the terminals and retransmitting them. The frequency of the retransmitted signals are offset from the frequency at which the signals were received. The method comprises transmitting a signal from the first terminal to the satellite at a first frequency, receiving the retransmitted signal from the satellite at the first terminal at a second frequency, the second frequency being offset from the first frequency by the satellite, measuring, at the first terminal, the difference between the first frequency and the second frequency to obtain a first offset. Upon obtaining the first offset, it is transmitted from the first terminal to the second terminal and the transmit frequency of the second terminal is adjusted using the first offset. Preferably, the step of adjusting the transmit frequency encompasses determining a terminal offset and adding the difference between the terminal offset and the first offset to the second terminal transmit frequency.

BRIEF DESCRIPTION OF THE DRAWINGS

These and other aspects of the invention will be more fully understood by reference to the following figures wherein.

DETAILED DESCRIPTION OF THE INVENTION

Figure 1:
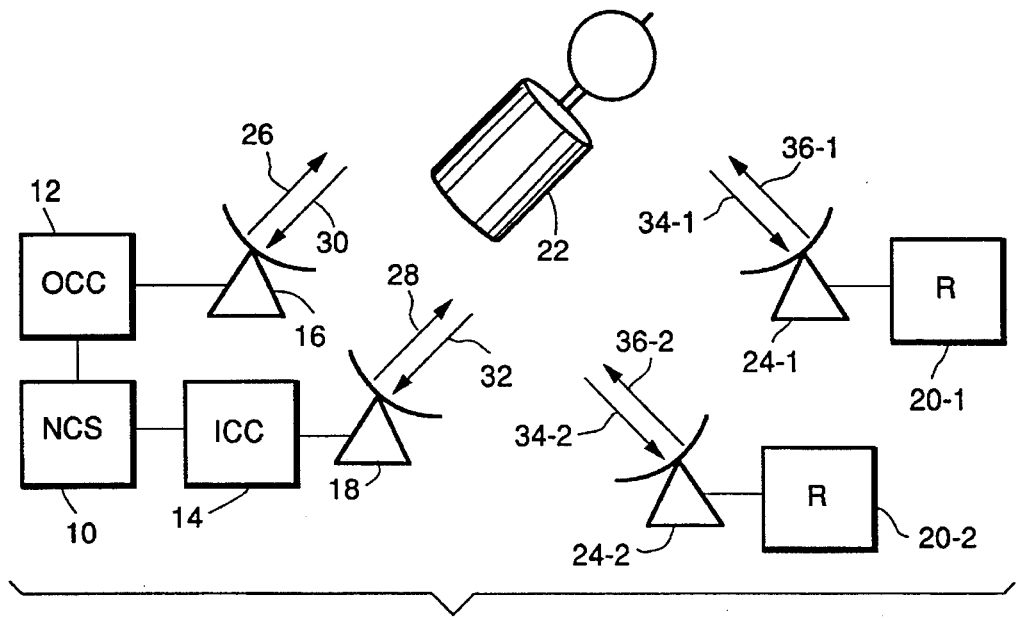
FIG. 1 is a diagram of a satellite communications network suitable for use with the present invention.
Figure 2:
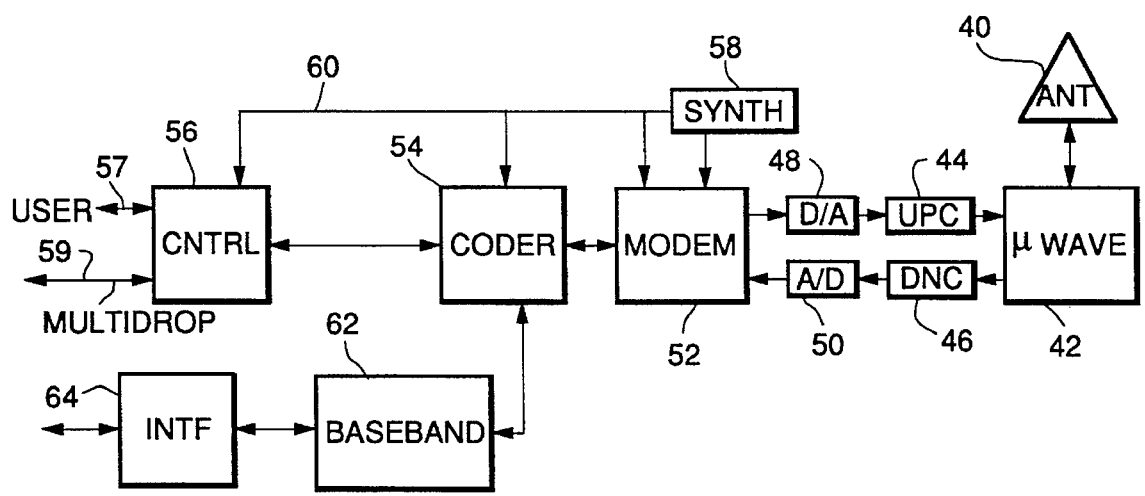
FIG. 2 is a block diagram of a channel unit suitable for use in the network of FIG. 1.

Referring to FIG. 1, a typical satellite communications network suitable for use with the present invention is controlled by a Network Control System (NCS) 10 which has an Outbound Control Channel (OCC) 12 and an Inbound Control Channel (ICC) 14. The two channels are each depicted as having their own radio frequency terminal and satellite antenna or dish 16, 18, respectively, although it is preferred that a single dish be used. The hardware for the OCC and the ICC typically consists of a single printed circuit card for each, such as that shown in FIG. 2, which is coupled to the NCS using an asynchronous port. Each card constitutes one channel unit. The cards can be located together or separated from each other by a considerable distance. The ICC and OCC preferably communicate through the NCS over an asynchronous communications bus using a standard communications protocol such as the RS232 standard as set by ANSI. Accordingly, it is preferred that the ICC and OCC be mounted in a single chassis with the appropriate communications and other buses wired into the chassis. However, as is well known in the art, it is also possible to transmit RS232 communications over large distances. In addition, it may be desired to provide for a backup OCC and ICC at remote locations in case of disaster, however such provisions are not essential to the operation of the present invention. The OCC and ICC communicate with a number of remote terminals 20-1, 20-2 via a satellite 22. While two remotes are shown for simplicity, there may be hundreds or thousands of remotes. Each remote ground station or terminal has its own radio frequency terminal and antenna or dish 24-1, 24-2. The OCC and ICC transmit uplink signals 26, 28 respectively, to the satellite which receives them and retransmits them as downlink signals to all of the antennas in the network including the OCC 30, the ICC 32 and all of the reinores 34-1, 34-2. Similarly uplink signals 36-1, 36-2 transmitted to the satellite by the reinores are received by the satellite and broadcast by the satellite as downlink signals to all of the ground stations within the satellite's broadcast footprint including the OCC and ICC. It is preferred that the OCC transmits to the reinores and receives only its own signal and conversely that the ICC only receives signals from the reinores. For purposes of the present invention, the ICC preferably transmits signals only for tuning purposes. However, other configurations are possible.

The NCS manages and controls the ground station network and determines the communications channel assignments. Typically the NCS is implemented in a mini- or microcomputer and includes central processing and database facilities as well as operator consoles, as is well known in the art. The frequency and channel assignments are preferably communicated to the remotes over the satellite link on an outbound control channel and to the OCC and ICC over the communications bus.

The tuning system of the present invention is based upon the following basic assumptions about the satellite communications network, however, the system can be modified to accommodate variations in these assumptions: (1) The frequency error introduced by the transmit section of a radio frequency terminal and antenna, $O_t$, and by the receive section of the same radio frequency terminal and antenna, $O_r$, are equal and opposite and therefore cancel each other out. (2) The satellite frequency offset, S, experienced by each channel unit is the same as that experienced by every other channel unit at any one time. (3) The OCC is the reference for the entire system. (4) The operating frequency for all channel units in the network is offset by a fixed amount, $O_{to}$, as explained below.

The tuning system of the present invention is preferably begun by the OCC. As system operation begins, the OCC broadcasts information to all terminals at a frequency $F_1$ assigned by the NCS. This frequency is offset by whatever offsets there may be in the OCC's transmitter $O_{to}$ so that the signal is received by the satellite at a frequency of $F_1+O_{to}$. The signal is retransmitted by the satellite which introduces its own offset and drift, S and then received again by the OCC which introduces an offset in its receiver $O_{ro}$. The resultant signal then has a frequency equal to $F_1+O_{to}+S+O_{ro}$. Assuming that the OCC's transmitter and receiver introduce approximately equal and opposite amounts of offset, i.e. $O_{to}=-O_{ro}$, the resultant signal has a frequency of $F_1+S$. As a result, by listening to the downlink transmission of the signal which it has just transmitted on the uplink, the OCC can measure the total amount of drift and offset introduced by the satellite S which is simply the difference between the frequency at which the signal was transmitted and the frequency at which the signal was received. It can be assumed for purposes of this discussion that uplink and downlink frequencies for any particular signal are the same except for the satellite drift, although this is rarely the case. However, the difference between uplink and downlink frequencies is also known at the NCS and can therefore also be subtracted out from the equations. Alternatively, S can be regarded as incorporating this difference as well as any inconsistencies in it. Having determined S, the OCC then broadcasts the value of S to all of the other terminals, preferably over the satellite. However, the ICC preferably receive the S value over the communications bus. Using additional channel unit cards, it is also possible to provide a remote at the ICC or OCC which shares the radio frequency terminal with the OCC or ICC. This can allow voice and data communications between a user at the OCC or ICC and a user at a distant remote. For consistency, however, it is preferred that even the channel units which are colocated with the OCC receive S over the satellite link. It is possible that S may vary with changes in the satellite and the environment so it is preferred that the OCC remeasure S at regular intervals, for example, twenty (20) seconds and then retransmit S at these intervals. This helps to ensure that recently actuated remote channel units are properly calibrated and that drift in the satellite and in the reinores is accommodated. Different intervals may be chosen according to the circumstances.

The remotes receive broadcasts from the OCC at the assigned frequency $F_1$ shifted by the OCC's transmitter $O_{to}$, by the satellite drift and offset S and by any offsets in the remote's own receiver $O_{rr}$, i.e. the received frequency at the remote is $F_1+O_{to}+S+O_{rr}$. The remote has received numerical values for $F_1$ and for S. This allows it to tune its receivers and transmitters to a value which it will treat as $F_1$ which shall be designated $F_{1r}$. The remote measures the received frequency and then subtracts S from it. This value, $F_1+O_{to}+O_{rr}$ is then $F_{1r}$. When the remote is to transmit a signal, the frequency of the signal, e.g. $F_2$, is assigned by the OCC. The signal will actually be transmitted on a new frequency $F_{2r}$ which will be derived from the tuning done based on $F_{1r}$. As transmitted from the remote's transmitter, $F_{2r}=F_2+O_{to}+O_{rr}+O_{tr}=F_2+O_{to}$, since $O_{rr}=-O_{tr}$, where $O_{tr}$ is the offset of the remote's transmitter. The transmissions are accordingly all offset by $O_{to}$. While it can be assumed that the remote's transmitter and receiver introduce approximately equal and opposite amounts of offset, i.e. $O_{tr}=-O_{rr}$, it is generally less accurate to assume that the OCC's transmitter and the remote's receiver introduce approximately equal and opposite amounts of offset, i.e. $O_{to}\neq-O_{rr}$. Similarly, when the remote tunes to receive a signal it will tune to a frequency which is also offset by $O_{to}$ because its tuners are all calibrated to the signal received from the OCC which included $O_{to}$. The other reinores which communicate with the tuned remote will receive signals at a frequency offset by $O_{to}+S$, but the other reinores will also be tuned to the frequency offset by $O_{to}$ and S just as the transmitting remote is.

The ICC, if it listens to the OCC, can tune in the same way as the reinores except that it receives the numerical values for $F_1$ and S over the communications bus. However, as the inbound control channel, its primary function is to tune to and listen to the reinores. On the other hand, the ICC may receive a large number of transmissions from different reinores and can use these for tuning. Each transmission from a remote is received at a frequency of $F_2+O_{to}+S+O_{ri}$, where $F_2$ is the assigned broadcast frequency numerical value. As explained above, $F_{2r}=F_2+O_{to}$ and is the frequency at which the remote is actually broadcasting. As before, the difference between the uplink and downlink frequencies are known to the ICC and will be ignored for purposes of this discussion. The ICC subtracts S from the received frequency and tunes its transmitters to $F_{2r}$ as if it were $F_2$ thereby incorporating $O_{to}$ into its tuning. Accordingly, where $O_{ri}$ is the offset of the ICC's receiver and $O_{ti}$ is the offset of the ICC's transmitter, the ICC transmits at $F_3+O_{to}+O_{ri}+O_{ti}=F_3+O_{to}$ just as the remotes do. It is again assumed that $O_{ti}=-O_{ri}$. The ICC can recalibrate its tuning at any time without consuming additional bandwidth or interrupting any communications with the remotes.

It is preferred that the ICC repeatedly receives signals from remotes and subtracts each known remote terminal transmission frequency ($F_3$) and the offset (S) so that a plurality of terminal offset values are calculated using a plurality of different remote terminals. The ICC then averages the plurality of terminal offset values to obtain an average terminal offset. The step of adding the difference ($O_{to}$) becomes adding the difference between the average terminal offset and the first offset to the second terminal transmit frequency ($F_3$). The remotes can use a similar approach when communicating with each other, however, it is preferred that the remotes tune only to the OCC to reduce the possibility of the reinores drifting away from the OCC together during long communications with other reinores. The remotes can be provided with a timer that requests a transmission from the OCC at predetermined intervals so that the remote will not drift out of tune during long periods of silence or long communications with other reinores. In most applications, communications with other reinores are brief and communications with the OCC are frequent so that no such transmission request would be necessary.

The network system of FIG. 1 is preferably implemented using conventional hardware. All of the transmitting and receiving functions of each of the ground stations can be implemented using channel units, each of which are based on hardware such as that shown in the block diagram of FIG. 2. In other words the hardware of FIG. 2 can be used for the ICC, for the OCC and for the remotes. The system has an antenna 40 for transmitting and receiving signals to and from the satellite, which is connected to a microwave stage 42 for amplifying and filtering the signals as necessary at the frequencies typically used for satellite communications. The microwave stage is connected on the transmit end to an upconverter 44 and on the receive end to a downconverter 46. The converters bring the signals to a frequency that can be more easily processed. The converters are coupled to digital-to-analog and analog-to-digital converters 48, 50, respectively, which are in turn coupled to a modem 52. The modem is coupled to a channel coder 54 which either encodes or decodes the signals transmitted to or received from the satellite. The channel coder is coupled to a control processor 56. If the signals are control and system management signals they are either generated by or are relayed to the control processor. The processor has several pods for external communications. These include an interface to the chassis, a relay port and a debug port (not shown). A communications port 57 allows RS232 signals to be received and transmitted. In the case of the OCC and ICC, this is used for communications with the NCS. In the case of remote channel units, the RS232 port is used for data that is transmitted and received over the satellite link to and from other remotes. A multidrop bus port 59 is used by remote channel units to allow channel units to communicate with the NCS through a monitor channel unit. It is preferred that each remote communications site includes a monitor channel unit which listens constantly to the OCC. The multidrop port connecting the monitor channel unit and a communicating channel unit allows information to be transmitted from the OCC through the monitor channel unit and the multidrop to the communicating channel unit while the communicating channel unit is listening or transmitting to another remote on a different channel. The remote channel units preferably listen to the OCC directly when they are not involved in a call. The control processor is responsible for all necessary calculations and for communicating instructions to the other parts of the system. In the case of tuning it stores the received value of S and properly calibrates a set of frequency synthesizers 58 using a control bus 60 which connects the processor with the synthesizers. It also instructs the synthesizers as to the proper frequencies to generate. The synthesizers apply the frequencies to the modem. The control processor also controls the channel coder using the same control bus.

The channel coder is also connected to a baseband signal processor 62 which is connected to an interface 64. The interface is used to connect with data which is to be sent over the satellite network. The interface can be coupled to a variety of different data sources, for example a four wire telephone system, a four wire computer modem or fax network, a video teleconferencing system, an inventory and control system, etc. The baseband signal processor reformats the data received from the interface for coding by the channel coder and reformats data from the channel coder so that it can be understood by the interface. The precise manner of operation of the modem, channel coder, baseband signal processor, and interface are beyond the scope of the present invention and will be understood by those skilled in the art.

While only a few embodiment have been discussed above, a great variety of modification and adaptations can be made to the described embodiments without departing from the scope of the present invention. By describing only a few embodiments it is not intended to limit the present invention to those embodiments but only to the scope of the claims below.

What is claimed is:

1. In a satellite communications network having a first terminal for transmitting and receiving signals, a second terminal in communication with the first terminal for transmitting signals and a satellite for receiving signals from the terminals and retransmitting them, the frequency of the retransmitted signals being offset from the frequency at which the signals were received, a method for compensating a transmit frequency of the second terminal for satellite and terminal frequency offsets comprising:

transmitting a signal from the first terminal to the satellite at a first frequency for retransmission to the first and second terminals;

receiving the signal transmitted by the first terminal from the satellite at the first terminal at a second frequency, the second frequency being offset from the first frequency by the satellite;

measuring, at the first terminal, the difference between the first frequency and the second frequency to obtain a first offset;

transmitting the first offset from the first terminal to the second terminal;

receiving, at the second terminal, a signal from the first terminal via the satellite for which the transmission frequency from the first terminal is known;

subtracting, at the second terminal, the known first terminal transmission frequency and the first offset from the frequency of the received signal to obtain a terminal offset;

adding, at the second terminal, the difference between the terminal offset and the first offset to the second terminal transmit frequency.

2. The method of claim 1 wherein the step of transmitting the first offset comprises transmitting the first offset via the satellite.

3. The method of claim 1 wherein the step of transmitting the first offset comprises transmitting the first offset over a wired terrestrial communications bus interconnecting the first and second terminals.

4. The method of claim 1 wherein the method further comprises;

periodically repeating the steps of transmitting from the first terminal, receiving the retransmitted signal and measuring the difference in order to redetermine the first offset; and then periodically receiving the redetermined first offset from the first terminal.

5. The method of claim 4 wherein the first terminal comprises a control terminal transmitting at a control channel frequency, wherein the second terminal comprises a communications terminal, wherein the network comprises a plurality of other communications terminals, the second terminal communicating with other communications terminals on communications channel frequencies and wherein the step of receiving the redetermined first offset comprises tuning the second terminal to the control channel frequency after the conclusion of a communication with another communications terminal.

6. In a satellite communications network having a first terminal for transmitting and receiving signals, a second terminal in communication with the first terminal for transmitting signals, a plurality of other terminals in communication with the first and second terminals and a satellite for receiving signals from the terminals and retransmitting them, the frequency of the retransmitted signals being offset from the frequency at which the signals were received, a method for compensating a transmit frequency of the second terminal for satellite and terminal frequency offset comprising:

transmitting a signal from the first terminal to the satellite at a first frequency for retransmission to the first and second terminals;

receiving the signal transmitted by the first terminal from the satellite at the first terminal at a second frequency, the second frequency being offset from the first frequency by the satellite;

measuring, at the first terminal, the difference between the first frequency and the second frequency to obtain a first offset;

transmitting the first offset from the first terminal to the second terminal;

receiving, at the second terminal, a signal from an other terminal via the satellite for which the transmission frequency from the other terminal is known;

subtracting, at the second terminal, the known other terminal transmission frequency and the first offset from the frequency of the received signal to obtain the terminal offset;

adding, at the second terminal, the difference between the terminal offset and the first offset to the second terminal transmit frequency.

7. The method of claim 6 further comprising repeating the steps of receiving a signal from an other terminal and subtracting each known other terminal transmission frequency so that a plurality of terminal offset values are calculated using a plurality of different other terminals, the method further comprising averaging the plurality of terminal offset values to obtain an average terminal offset, and wherein the step of adding the difference comprises adding the difference between the average terminal offset and the first offset to the second terminal transmit frequency.

8. The method of claim 6 wherein the step of transmitting the first offset comprises transmitting the first offset via the satellite.

9. The method of claim 6 wherein the step of transmitting the first offset comprises transmitting the first offset over a wired terrestrial communications bus interconnecting the first and second terminals.

10. The method of claim 6 wherein the method further comprises:

periodically repeating the steps of transmitting from the first terminal, receiving the retransmitted signal and measuring the difference in order to redetermine the first offset; and then periodically receiving the redetermined first offset from the first terminal.

11. The method of claim 10 wherein the first terminal comprises a control terminal transmitting at a control channel frequency, wherein the second terminal comprises a communications terminal, wherein the network comprises a plurality of other communications terminals, the second terminal communicating with other communications terminals on communications channel frequencies and wherein the step of receiving the redetermined first offset comprises tuning the second terminal to the control channel frequency after the conclusion of a communication with another communications terminal.

* * * * *